United States Patent
Ito

(10) Patent No.: US 11,428,525 B2
(45) Date of Patent: Aug. 30, 2022

(54) METHOD AND APPARATUS FOR ESTIMATING INTERNAL STATE OF THERMAL COMPONENT

(71) Applicant: Mitsubishi Heavy Industries, Ltd., Tokyo (JP)

(72) Inventor: Hiroshi Ito, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 282 days.

(21) Appl. No.: 16/551,763

(22) Filed: Aug. 27, 2019

(65) Prior Publication Data

US 2020/0103227 A1 Apr. 2, 2020

(30) Foreign Application Priority Data

Sep. 28, 2018 (JP) .............................. JP2018-183766

(51) Int. Cl.
  *G01B 21/16* (2006.01)
  *G06F 30/20* (2020.01)

(52) U.S. Cl.
  CPC ............. *G01B 21/16* (2013.01); *G06F 30/20* (2020.01)

(58) Field of Classification Search
  None
  See application file for complete search history.

(56) References Cited

U.S. PATENT DOCUMENTS

2009/0131782 A1  5/2009  Moonen et al.
2012/0101775 A1  4/2012  Mitchell et al.
(Continued)

FOREIGN PATENT DOCUMENTS

CN  103261586 A  8/2013
CN  103400015 A  11/2013
(Continued)

OTHER PUBLICATIONS

Holz, et al., "Transient temperature calculation method for complex fluid-solid heat transfer problems with scattering boundary conditions", Jun. 1, 2018 (Year: 2018).*

Rahman et al., "A univariate dimension-reduction method for multi-dimensional integration in stochastic mechanics", Apr. 29, 2004, Probabilistic Engineering Mechanics 19 (2004), pp. 393-408 (Year: 2004).*

(Continued)

*Primary Examiner* — Brent A. Fairbanks

(74) *Attorney, Agent, or Firm* — Mattingly & Malur, PC

(57) ABSTRACT

A method of estimating an internal state of a thermal component of the invention includes a measurement step of measuring state quantity of the thermal component, an analysis-condition creation step of creating an analysis condition, a data assimilation step of obtaining probability distribution of each temperature distribution and displacement distribution through data assimilation calculation using a contraction model, a measured value, and the analysis condition, a post-processing step of obtaining the internal state of the thermal component, an analysis step of obtaining solution vectors of the temperature distribution and the displacement distribution, and a contraction-model construction step of extracting a subspace characterizing a linear space of a vector set and constructing a contraction model using the subspace, wherein, in the data assimilation step, the probability distribution is calculated using the contraction model, and, in the analysis step and the contraction-model construction step, the contraction model is constructed.

7 Claims, 8 Drawing Sheets

(56) References Cited

U.S. PATENT DOCUMENTS

2013/0177388 A1* 7/2013 Ehrsam .................. F02C 7/26
                                                                                                       415/1
2019/0179986 A1 6/2019 Monde et al.

FOREIGN PATENT DOCUMENTS

| | | | |
|---|---|---|---|
| JP | 2000-346304 A | | 12/2000 |
| JP | 2014026440 A | * | 7/2012 |
| JP | 2014-26440 A | | 2/2014 |
| JP | 5457805 B2 | | 4/2014 |
| JP | 2017-78943 A | | 4/2017 |
| JP | 2018-97505 A | | 6/2018 |
| JP | 2018-142200 A | | 9/2018 |
| WO | 2007/036409 A1 | | 4/2007 |
| WO | 2015/071654 A1 | | 5/2015 |

OTHER PUBLICATIONS

Biyik et al., "Reduced Order Modeling for Clearance Control in Turbomachinery", Sep. 22, 2017, 2016 IEEE Conference on Control Applications, pp. 1143-1148 (Year: 2016).*
Chinese Office Action received in corresponding Chinese Application No. 201910905605.8 dated Apr. 2, 2021.
Indian Office Action received in corresponding Indian Application No. 201914035287 dated Apr. 29, 2021.
Korean Office Action received in corresponding Korean Application No. 10-2019-0117894 dated Nov. 17, 2020.
Korean Office Action received in corresponding Korean Application No. 10-2019-0117894 dated Jun. 29, 2021.
Japanese Office Action received in corresponding Japanese Application No. 2018-183766 dated Aug. 3, 2021.
Chinese Office Action received in corresponding Chinese Application No. 201910905605.8 dated Nov. 1, 2021.

* cited by examiner

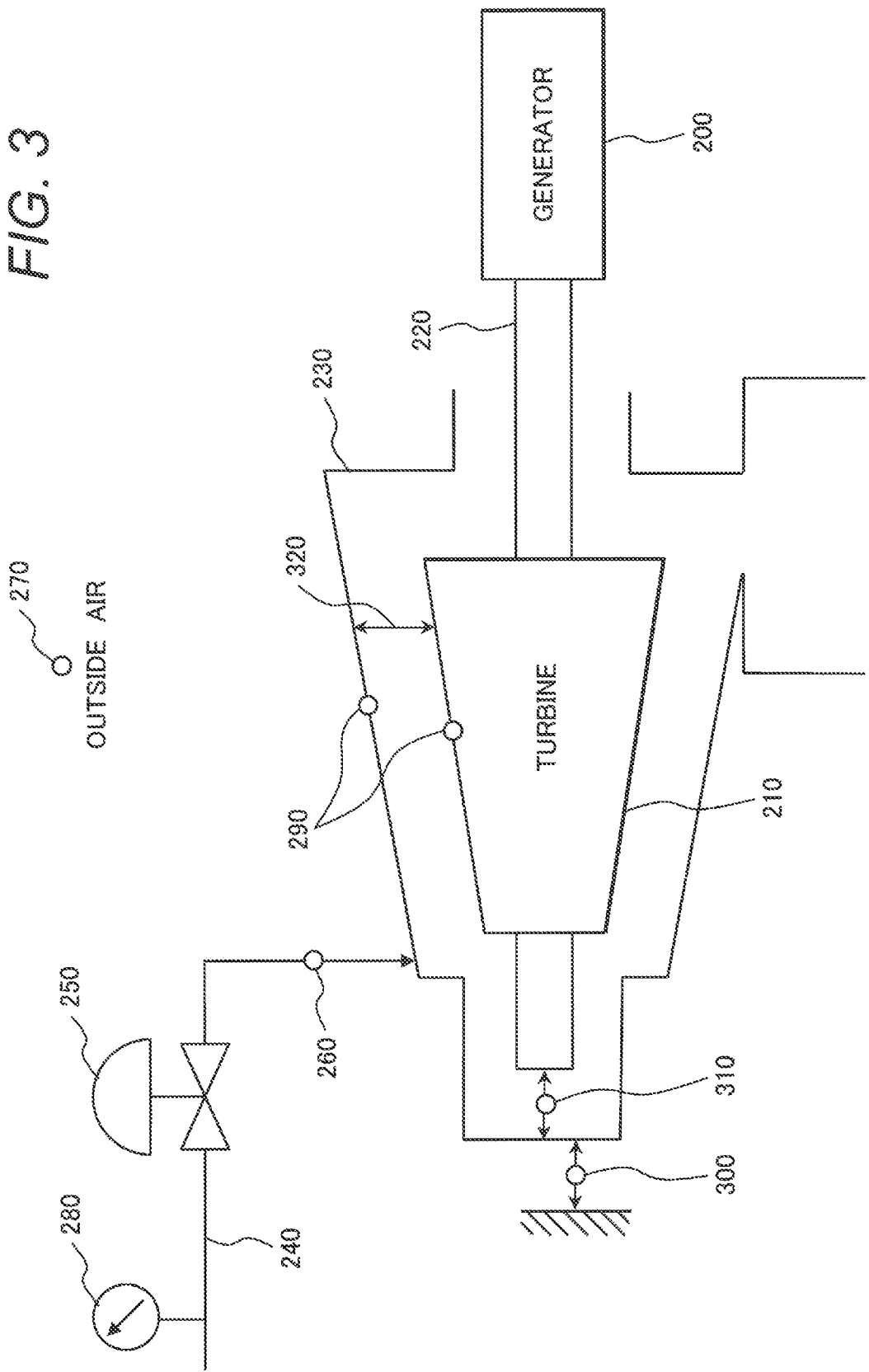

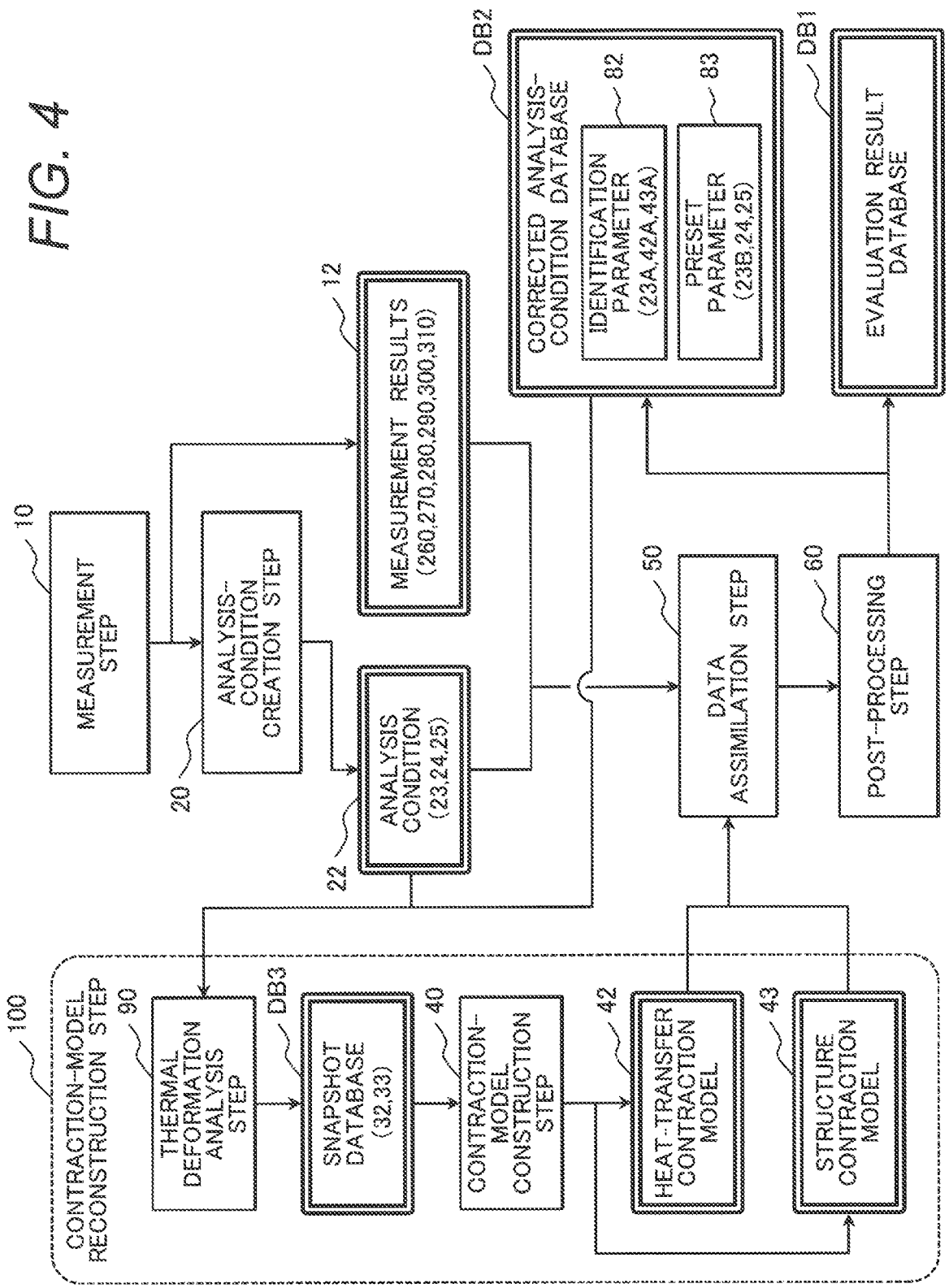

FIG. 5

UNKNOWN VARIABLES (PROBABILITY DISTRIBUTION)

| TYPE | SYMBOL | MEANING |
|---|---|---|
| STATE VARIABLE | $\phi 1$ | CONTRACTION TEMPERATURE VECTOR |
| STATE VARIABLE | $\phi 2$ | CONTRACTION DISPLACEMENT VECTOR |
| STATE VARIABLE | $h_f\ (f = 1, ..., nb\_23A)$ | HEAT TRANSFER RATE 23A |
| STATE VARIABLE | $\varepsilon_f^2\ (f = 1, ..., nb\_23A)$ | DISPERSION IN RANDOM WALK OF $h_f$ |
| OBSERVATION VARIABLE | $X1_{obj}$ | VECTOR CONSISTING OF TEMPERATURES AT THERMOMETER INSTALLATION POINTS |
| OBSERVATION VARIABLE | $X2_{obj}$ | VECTOR CONSISTING OF EXPANSIONS / DIFFERENTIAL-EXPANSIONS AT INSTALLATION POINTS OF EXPANSION / DIFFERENTIAL-EXPANSION INDICATORS |
| EVALUATION VARIABLE | $X2_{pred}$ | VECTOR CONSISTING OF CLEARANCES AT EVALUATION POSITIONS |

PRESET PARAMETER

| SYMBOL | MEANING |
|---|---|
| $h_f$ | HEAT TRANSFER RATE 23B OF EACH SURFACE ($f = nb\_23A+1, \cdots, nb\_surfaces\_HTC$) |
| $TG_f$ | AMBIENT TEMPERATURE 24 OF EACH SURFACE ($f = 1, \cdots, nb\_surfaces\_P$) |
| $P_f$ | WALL SURFACE PRESSURE OF EACH SURFACE 25 ($f = 1, \cdots, nb\_surfaces\_P$) |
| $\tau^2$ | DISPERSION IN RANDOM WALK OF $h_f$ ($f = 1, \cdots, nb\_surfaces\_HTC$) |

METHOD AND APPARATUS FOR ESTIMATING INTERNAL STATE OF THERMAL COMPONENT

CLAIM OF PRIORITY

The present application claims priority from Japanese Patent Application JP 2018-183766 filed on Sep. 28, 2018, the content of which is hereby incorporated by reference into this application.

BACKGROUND OF THE INVENTION

The present invention relates to a method and an apparatus for estimating an internal state of a thermal component such as a turbine or a boiler, and specifically relates to the method and the apparatus to accurately estimate the internal state of the thermal component by a simple technique.

In the thermal component such as the turbine or the boiler, into which a high-temperature fluid (vapor, gas) is introduced, internal thermal stress is known to occur particularly in a certain state such as a start-stop state. A clearance between metals, such as between a turbine casing and a turbine, is supposed to be reduced due to thermal expansion of a metal of a thermal component structure.

Such internal states including the thermal stress and the clearance are monitoring items that must be noted in controlling or monitoring in terms of a life of the thermal component, destruction of the thermal component structure, or efficiency of the thermal component. JP 5457805 B2 discloses a traditional monitoring control technique. In a technique disclosed in JP 5457805 B2, thermal stress is monitored and controlled among the internal states, and a numerical model is used to estimate thermal stress of a rotor from temperature and pressure of vapor as an estimation technique of the thermal stress.

When the internal condition is estimated using the numerical model as disclosed in JP 5457805 B2, the numerical model is often configured by a finite element method to improve estimation accuracy. A typical analysis technique in such a case is shown in FIG. 2 by an exemplary clearance evaluation method.

The traditional technique of FIG. 2 typically includes a measurement step 10, an analysis-condition creation step 20, a thermal deformation analysis step 90 as a finite element analysis step, a post-processing step 60, and a tuning step 110.

In this technique, analysis conditions 22 are created from measured values in the measurement step 10 and the analysis-condition creation step 20. The analysis-condition creation step 20 may use a fluid/heat transfer circuit network analysis.

Subsequently, in the thermal deformation analysis step 90, finite element analysis is performed using the analysis conditions 22 to obtain temperature distribution and deformation distribution of a metal portion. Subsequently, in the post-processing step 60, temperature, expansion/differential-expansion, and a clearance at a position of a measurement point are evaluated from the results of the thermal deformation analysis step 90, and results of such evaluation are output to an evaluation result database DB1.

The technique further includes a tuning step 110, in which the temperature and the expansion/differential-expansion in the evaluation result database DB1 are each compared to a corresponding measured value, and a parameter of a calculation model used in the analysis-condition creation step 20 is corrected such that a difference between the two is reduced to improve clearance evaluation accuracy.

Examples of the parameter of the calculation model used in the analysis-condition creation step 20 include various model parameters involved in fluid resistance or a heat transfer coefficient in the fluid/heat transfer circuit network analysis. A mathematical approach such as genetic algorithm may be used for the tuning.

A problem of the traditional method using the finite element method includes an increase in number of trials of finite element analysis having a high computation load with the number of parameters for tuning, which makes it difficult to respond to the case where immediacy is required.

During startup, flow in the turbine may form a spatially and temporally complicated pattern, and a condensation phenomenon of vapor may occur. This often leads to a case where time evolution of temperature distribution cannot be accurately predicted only by tuning of the parameter of the model used for the fluid/heat transfer circuit network analysis. In such a case, sufficient clearance evaluation accuracy cannot be ensured.

From the above, an object of the present invention is to provide a method and an apparatus for estimating an internal state of a thermal component, which each make it possible to accurately estimate the internal state by a simple technique.

SUMMARY OF THE INVENTION

A method of estimating an internal state of a thermal component of the present invention comprises a measurement step of measuring state quantity of the thermal component; an analysis-condition creation step of creating an analysis condition for analyzing an internal state of the thermal component; a data assimilation step of obtaining probability distribution of each of temperature distribution and displacement distribution in inside of the thermal component through data assimilation calculation using a contraction model, a measured value of the measurement step, and the analysis condition, wherein the contraction model is given by dimensionally lowering a finite element model for the internal state analysis of the thermal component; a post-processing step of obtaining the internal state of the thermal component from an expected value of the probability distribution obtained in the data assimilation step; an analysis step of obtaining solution vectors of the temperature distribution and the displacement distribution of the finite element model; and a contraction-model construction step of extracting a subspace characterizing a linear space defined by a vector set of the temperature distribution and the displacement distribution and constructing a contraction model from the finite element model using the subspace, wherein, in the data assimilation step, the probability distribution is calculated using the contraction model in the contraction-model construction step, and wherein, in the analysis step and the contraction-model construction step, the contraction model is constructed or reconstructed using a result value of the analysis-condition creation step.

An apparatus of estimating an internal state of a thermal component of the present invention is configured to perform a measurement step of measuring state quantity of the thermal component; an analysis-condition creation step of creating an analysis condition for analyzing an internal state of the thermal component; a data assimilation step of obtaining probability distribution of each of temperature distribution and displacement distribution in inside of the thermal component through data assimilation calculation using a contraction model, a measured value of the measurement step, and the analysis condition, wherein the contraction model is given by dimensionally lowering a finite element model for the internal state analysis of the thermal component; a post-processing step of obtaining the internal state of the thermal component from an expected value of the probability distribution obtained in the data assimilation step; an analysis step of obtaining solution vectors of the temperature distribution and the displacement distribution of the finite element model; and a contraction-model construction step of extracting a subspace characterizing a linear space defined by a vector set of the temperature distribution and the displacement distribution and constructing a contraction model from the finite element model using the subspace, wherein, in the data assimilation step, the apparatus calculates the probability distribution using the contraction model in the contraction-model construction step, wherein, in the analysis step and the contraction-model construction step, the apparatus constructs the contraction model using a result of the analysis-condition creation step, wherein the measurement step, the analysis-condition creation step, the data assimilation step, and the post-processing step are performed on a thermal component side, wherein the analysis step and the contraction-model construction step are performed on a center which can manage data in a plurality of power plants, and wherein communication is performed between the thermal component side and the center.

According to the present invention, the internal state can be accurately estimated by a simple technique.

BRIEF DESCRIPTION OF THE DRAWINGS

FIG. 3 is a view of an exemplary configuration of a power plant configured of a turbine and a generator;

FIG. 4 is a view illustrating a method and an apparatus for estimating an internal state of a thermal component according to Embodiment 2;

FIG. 5 is a view illustrating data on an unknown variable (probability distribution) used in a state space model;

DETAILED DESCRIPTION OF THE PREFERRED EMBODIMENTS

Figure 1:
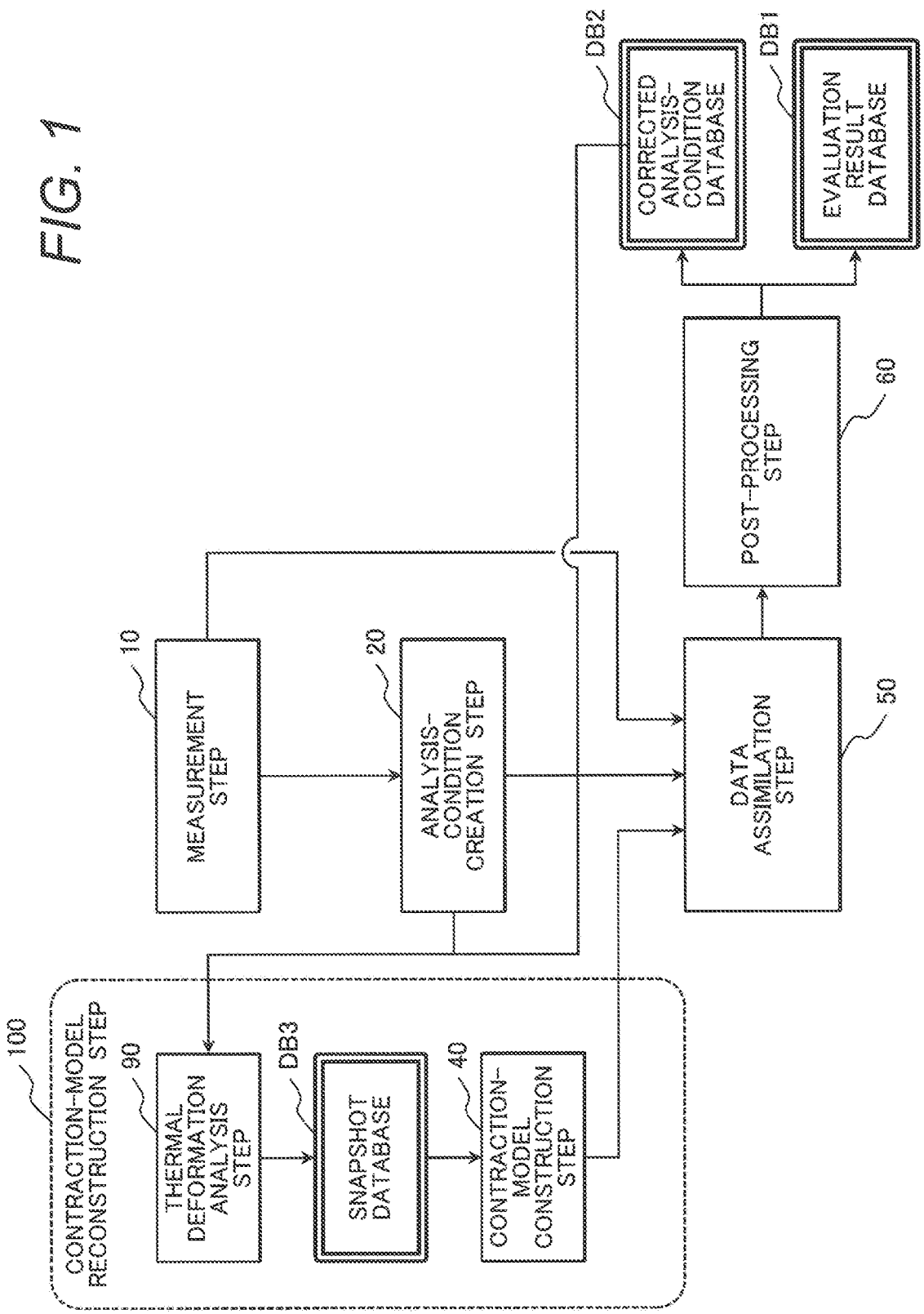
FIG. 1 is a view schematically illustrating a method and an apparatus for estimating an internal state of a thermal component according to the present invention.

Hereinafter, Embodiments of the present invention are described in detail with reference to drawings.

Embodiment 1

Embodiment 1 of the present invention exemplifies a turbine as a thermal component to which the present invention is applicable, and describes a basic idea to estimate thermal stress or a clearance that is an internal state of the thermal component.

First, the thermal component, to which the present invention is applicable, is a turbine such as a vapor turbine or a gas turbine or a structure such as a boiler, and the turbine is now described while being illustrated in FIG. 3.

FIG. 3 shows an exemplary configuration of a power plant configured of a turbine and a generator. The power plant of FIG. 3 includes a generator 200, a turbine 210, a turbine rotor 220 connected to the turbine 210 and the generator 200, a turbine casing 230 accommodating the turbine, a piping 240 supplying a working fluid to the turbine, and a control valve 250 provided in the piping 240.

In such a power plant, a high-temperature, high-pressure fluid (vapor or gas) as the working fluid is introduced through the piping 240 into the turbine casing 230 to drive the turbine 210, and such driving force is transmitted to the generator 200 via the turbine rotor 220 for power generation. The working fluid (vapor or gas) that has worked in the turbine 210 is then exhausted to the outside.

In such a thermal composition into which the working fluid (vapor or gas) is introduced, thermal stress is known to internally occur in a specific state such as start-stop. In addition, a clearance, such as a clearance between the turbine casing 230 and the turbine 210, is supposed to be reduced due to thermal expansion of a metal of the structure.

Such an internal state such as the thermal stress or the clearance is an item that must be noted in controlling and monitoring in terms of a life of the thermal component, destruction of the thermal component structure, or efficiency of the thermal component. However, since the internal state cannot be directly measured, an internal or external state of the thermal component is typically monitored and measured to estimate the internal state, and the estimation results are reflected in control of the control valve 250 or monitored.

The exemplary power plant of FIG. 3 includes at least one each of a working fluid thermometer 260 to measure temperature of the working fluid, an outside-air temperature gauge 270 to measure outside-air temperature of the turbine 210, and a pressure gauge 280 to measure working fluid pressure in order to estimate the internal state. The power plant further includes at least one metal thermometer 290 to measure metal temperature of each of the turbine rotor 220 and the casing. The power plant further includes at least one expansion indicator 300 to measure expansion of the casing or at least one differential-expansion indicator 310 to measure a clearance between the turbine rotor and the casing. It is natural that such measuring instruments, physical quantity to be measured, and a measurement position should be each appropriately selected in accordance with the thermal component to be monitored.

FIG. 1 is a view schematically illustrating a method and an apparatus for estimating an internal state of a thermal component according to the present invention. In FIG. 1, elements with reference signs 10, 20, 60, 90, and DB1 basically have the same configurations and functions as those of the measurement step 10, the analysis-condition creation step 20, the post-processing step 60, the thermal deformation analysis step 90 as the finite element analysis step, and the evaluation result database DB1, respectively, in the traditional technique of FIG. 2.

Figure 2:
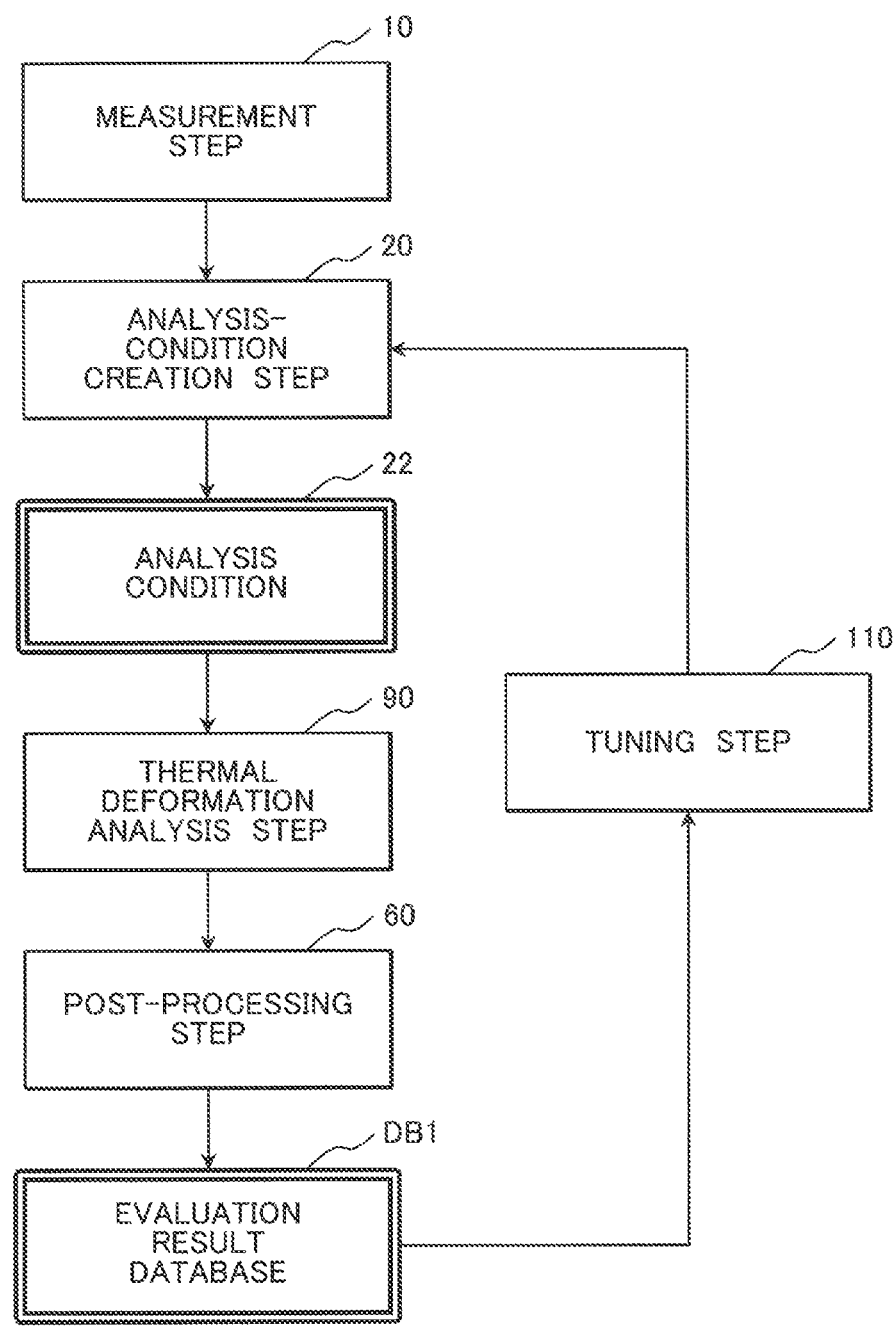
FIG. 2 is a view showing a typical analysis technique with an exemplary clearance evaluation method in the case of configuring a model by a finite element method.

Embodiment 1 can be recognized to be given by adding a contraction-model construction step 40, a data assimilation step 50, a corrected analysis-condition database DB2, and a snapshot database DB3 to the configuration of the traditional technique of FIG. 2.

In the method and the apparatus for estimating the internal state of the thermal component of the present invention of FIG. 1, respective parts or steps generally have the following functions.

The measurement step 10 measures state quantity (temperature, expansion, and the like) of a structure or state quantity (temperature, pressure, and the like) of atmosphere in a power plant. In the example of the turbine of FIG. 3, various state quantities are measured by the working fluid thermometer 260, the outside-air temperature gauge 270, the pressure gauge 280, the metal thermometer 290, the expansion indicator 300, and the differential-expansion indicator 310 to obtain measured values. In the analysis-condition creation step 20, an analysis condition of thermal deformation analysis is created.

In the data assimilation step 50, probability distribution of each of temperature distribution and displacement distribution and probability distribution of a corrected value of the analysis condition are obtained through data assimilation calculation using a contraction model given by dimensionally lowering a finite element model for the thermal deformation analysis and the measured value of the measurement step 10.

In the post-processing step 60, thermal stress of a portion, at which an inter-structure clearance, fatigue failure, or the like is a serious matter, and a corrected value of the analysis condition are obtained from the expected value of the probability distribution obtained in the data assimilation step 50, and are output into the evaluation result database DB1 and the corrected analysis-condition database DB2, respectively.

In the thermal deformation analysis step 90 being the finite element analysis step, solution vectors of the temperature distribution and the displacement distribution of the finite element model are obtained and output into the analysis result database (snapshot database DB3).

In the contraction-model construction step 40, a subspace characterizing a linear space defined by a vector set in the snapshot database DB3 is extracted and used to construct the contraction model.

The method and the apparatus for estimating the internal state of the thermal component of the present invention are configured as described above, so that a contraction model is constructed or reconstructed from a result of the analysis-condition creation step 20 and the corrected analysis-condition database DB2 by the thermal deformation analysis step 90 and the contraction-model construction step 40.

A first feature of the method and the apparatus, which each estimate the internal state of the thermal component according to Embodiment 1 of the present invention having the configuration of FIG. 1 as described above, is to use the contraction model given by dimensionally lowering a finite element equation as analysis means for data assimilation. This makes it possible to accelerate data assimilation calculation significantly compared with a case of directly using the finite element analysis.

A second feature of the method and the apparatus for estimating the internal state of the thermal component according to Embodiment 1 of the present invention is to have a contraction-model reconstruction step 100 to reconstruct a contraction model, i.e., a step of reconstructing a contraction model by expanding the snapshot database DB3 using the finite element analysis result at the condition stored in the corrected analysis-condition database DB2.

As the snapshot database DB3 contains a larger number of results similar to actually possible temperature distribution and displacement distribution of an objective structure, a more accurate contraction model can be produced. On the other hand, since the corrected analysis condition reflects a measurement result, thermal deformation analysis at a corrected analysis condition can be expected to contain temperature distribution and displacement distribution similar to actually possible temperature distribution and displacement distribution.

It is therefore possible to accurately evaluate thermal stress and thermal deformation by reconstructing the contraction model using the expanded snapshot database DB3.

The present invention makes it possible to accurately evaluate thermal stress and thermal deformation of a structure having a complicated shape within a practical time period. When measurement results before a certain time (initial time) are given, and when thermal deformation and thermal stress after the certain time are to be predicted, the present invention can be used as means for obtaining a structure temperature distribution at the initial time.

When an apparatus shown in FIG. 1 is configured, the apparatus is preferably configured such that the contraction-model reconstruction step 100 is provided on a center, steps of other portions are provided on a power plant side as an actual site, and communication can be performed between the center and the actual site via a communication facility. Consequently, the center can manage various data in a plurality of power plants in one place, and thus efficient operation is allowed while reflecting past operation performances in various power plants in design of a new power plant, for example. On the power plant side being the actual site, an apparatus configuration of the power plant can be simplified, and high-speed processing can be performed.

In summary, the present invention as described above is configured to be "a method of estimating an internal state of a thermal component, which is characterized by having a measurement step 10 of measuring state quantity of the thermal component, an analysis-condition creation step 20 of creating an analysis condition for analyzing the internal state of the thermal component, a data assimilation step 50 of obtaining probability distribution of each of temperature distribution and displacement distribution of the inside of the thermal component through data assimilation calculation using a contraction model given by dimensionally lowering a finite element model for the internal state analysis of the thermal component, a measured value of the measurement step 10, and the analysis condition, a post-processing step 60 of obtaining the internal state of the thermal component from an expected value of the probability distribution obtained in the data assimilation step 50, a thermal deformation analysis step 90 of obtaining solution vectors of the temperature distribution and the displacement distribution of the finite element model, and a contraction-model construction step 40 of extracting a subspace characterizing a linear space defined by a vector set of the temperature distribution and the displacement distribution and constructing a contraction model from the finite element model using the subspace, where the data assimilation step 50 calculates the probability distribution using the contraction model in the contraction-model construction step 40, and the thermal deformation analysis step 90 and the contraction-model construction step 40 construct or reconstruct the contraction model using the result of the analysis-condition creation step 20."

The present invention is further configured to be "a method of estimating the internal state of the thermal component, which is characterized in that the data assimilation step 50 further obtains probability distribution of a corrected value of the analysis condition, the post-processing step 60 further obtains the corrected value of the analysis condition, and the thermal deformation analysis step 90 and the contraction-model construction step 40 reconstruct a contraction model using the corrected value from the post-processing step 60".

Embodiment 2

In Embodiment 2, the configuration described in Embodiment 1 is specifically described in more detail. FIG. 4 is a view illustrating a method and an apparatus for estimating the internal state of the thermal component according to Embodiment 2.

To compare the detailed configuration and functions of Embodiment 2 to those of the traditional technique of FIG. 2, Embodiment 2 of FIG. 4 can be recognized such that a step corresponding to the tuning 110 of the traditional method of FIG. 2 is modified into the data assimilation step 50, and a metal-surface heat-transfer-rate condition is directly identified in the data assimilation step 50 to address the above-described problems (inaccurate prediction of time evolution of temperature distribution, and insufficient clearance evaluation accuracy).

Furthermore, Embodiment 2 uses a contraction model for the data assimilation calculation, so that evaluation time can be advantageously extremely reduced compared with the traditional method 1 directly using the finite element analysis.

Furthermore, Embodiment 2 introduces a mechanism (the contraction-model reconstruction step 100) of sequentially improving accuracy of a contraction model using measurement data as a mechanism of compensating a reduction in evaluation accuracy by using the contraction model.

Through the above configuration, Embodiment 2 can more accurately evaluate the clearance within a practical time than the traditional method 1.

The method and the apparatus for estimating the internal state of the thermal component of Embodiment 2 shown in FIG. 4 shows a method for evaluating a clearance 320, which is a clearance between the turbine 210 and the casing during startup operation, as an internal state using the measurement results of temperature, expansion, and differential expansion, and the like.

The measurement step 10 in FIG. 4 receives time-series data of working fluid temperature, working fluid pressure, outside-air temperature, metal temperature, expansion, and differential expansion from the measuring instruments 260, 270, 280, 290, 300, and 310, and outputs measurement results 12 while transmitting the measurement results 12 to the analysis-condition creation step 20.

The analysis-condition creation step 20 creates the analysis conditions 22 such as a metal-surface heat-transfer-rate 23, ambient (working fluid, outside air) temperature 24 in the vicinity of the metal, and wall surface pressure 25 required for performing thermal deformation analysis of a metal portion such as a turbine, a turbine rotor, and a casing based on the measured values obtained in the measurement step 10. For example, mass transport or heat transport of the working fluid during startup, heat transfer of the metal portion, heat transfer between the working fluid and the metal portion are simulated by fluid/heat transfer circuit network analysis, thereby such analysis conditions can be calculated.

The analysis conditions 22 (metal-surface heat-transfer-rate 23, ambient (working fluid, outside air) temperature 24 in the vicinity of the metal, and wall surface pressure 25) obtained in the analysis-condition creation step 20 are given to the contraction-model reconstruction step 100. Corrected analysis conditions (identification parameter 82, preset parameter 83) stored in the corrected analysis-condition database DB2 are given to the contraction-model reconstruction step 100.

The contraction-model reconstruction step 100 beforehand has a heat-transfer contraction model 42 and a structure contraction model 43, and reconstructs a contraction model based on the input analysis conditions 22 and the corrected analysis condition.

In the contraction-model reconstruction step 100, first, finite element analysis is performed using the analysis conditions 22 in the thermal deformation analysis step 90 as a finite element analysis step to obtain temperature distribution and deformation distribution of the metal portion. The data obtained as a processing result of the thermal deformation analysis step 90 is stored in the snapshot database DB3.

The snapshot database DB3 stores a date set of a node temperature vector 32 as a result of obtaining time evolution of temperature distribution of the metal portion during startup by a finite element method, and a node displacement vector 33 as a result of obtaining thermal deformation of metal due to temperature distribution of the node temperature vector 32 by a finite element method.

The analysis conditions 22 (metal-surface heat-transfer-rate 23, ambient (working fluid, outside air) temperature 24 in the vicinity of the metal, the wall surface pressure 25) obtained in the analysis-condition creation step 20, or corrected analysis conditions (identification parameter 82, preset parameter 83) as described later from the corrected analysis-condition database DB2 are used as analysis conditions for the finite element method in the thermal deformation analysis step 90.

The contraction-model construction step 40 extracts a subspace characterizing a linear space defined by the temperature distribution given by the node temperature vector 32 in the snapshot database DB3, and produces the heat-transfer contraction model 42 from a finite element equation, which is given by discretizing a dominant equation of a heat transfer phenomenon of a metal portion, by Galerkin projection onto the subspace. Furthermore, the contraction-model construction step 40 extracts a subspace characterizing a linear space defined by the displacement distribution (vector) given by the node displacement vector 33 in the snapshot database DB3, and produces the structure contraction model 43 from a finite element equation, which is given by discretizing a dominant equation of thermal deformation, by Galerkin projection onto the subspace. This makes it possible to produce the simple contraction model 42 or 43, in which a finite element equation is represented by about 50 to 100 unknown variables and equations, while the finite element equation is represented by about one million unknown variables and equations, for example.

In FIG. 4, the data assimilation step 50 receives the measurement results 12 (time-series data of working fluid temperature, working fluid pressure, outside-air temperature, metal temperature, expansion, and differential expansion) of the power plant, and the analysis conditions 22 (the metal-surface heat-transfer-rate 23, the ambient (working fluid, outside air) temperature 24 in the vicinity of the metal, the wall surface pressure 25), and the contraction models (heat-transfer contraction model 42, structure contraction model 43) obtained in the contraction-model construction step 40, and uses state space models including the contraction models 42 and 43 to obtain time evolution of a state variable (probability distribution) containing an identification parameter 82 (model variable 42A determining the temperature distribution in the heat-transfer contraction model 42, model variable 43A determining the displacement distribution in the structure contraction model 43, and a metal-surface heat-transfer-rate condition 23A to be intentionally identified from the measured values in metal-surface heat-transfer-rate conditions 23) by a particle filter method. The heat-transfer-rate condition 23A of the identification parameter 82 is treated as a state variable having a random-walk-type time evaluation process to allow identification from the measured values.

In the following description, a condition to be preset for data assimilation, i.e., a heat-transfer-rate condition 23B corresponding to the metal-surface heat-transfer-rate conditions 23 excluding the condition 23A, the ambient (working fluid, outside air) temperature 24 in the vicinity of the metal, and the wall surface pressure 25 are each defined as the preset parameter 83.

The identification parameter 82 and the preset parameter 83 obtained in the data assimilation step 50 are finally stored in the corrected analysis-condition database DB2 after performing the following post-processing step 60, and used in the subsequent contraction model reconstruction processing.

In the particle filter method performed by the data assimilation step 50, probability distribution of the state variable is defined by a set of particles each having a specific state variable value, and then time evolution of the probability distribution is obtained through repetition of the following processing steps S1a to S1d. For the preset parameter 83, results of the analysis conditions 22 are allocated to all the particles.

In the processing step S1a, time evolution calculation is performed at a predetermined interval on each particle using the state space models.

In the processing step S1b, values of measurement instruments (260, 270, 280, 290, 300, 310) are evaluated from state valuable values of the particles, and values of the matching degree (likelihood) with measured values at the same time are calculated.

In the processing step S1c, the number of particles is assumed to be N, and N particles are selected and duplicated from among a particle set while repetition is permitted, and an original particle set is replaced with the duplicated particle set. A larger number of particles are selected with a higher likelihood. This allows a particle closer to a measured value to survive, leading to a result reflecting a measurement result.

The processing step S1d returns to the processing step S1a.

Time evolutions of the state variables (probability distributions represented by particle sets) including 42A and 43A as the model variables corrected with the measurement results and the identification parameter 82 are obtained through the above processing steps S1a to S1d.

In the post-processing step 60, an expected value of the probability distribution of the model variable 43A is substituted for a beforehand derived relational expression of the model variable 43A and a clearance of each portion to obtain a temporal variation in the clearance during startup, and the obtained results are output into the evaluation result database DB1. Furthermore, the corrected analysis condition including the expected value of the identification parameter 82 and the preset parameter 83 is output into the corrected analysis-condition database DB2.

Although Embodiment 2 illustrated in FIG. 4 has been exemplified on turbine startup, the present invention can be similarly applied to any load variation operation including stop operation.

In a modified configuration of Embodiment 2, processes on a series of the measurement step 10, the analysis-condition creation step 20, the data assimilation step 50, and the post-processing step 60 are linked to one another, thereby the clearance can be evaluated in real time.

Since contraction model analysis and data assimilation is easily calculated at high speed by GPGPU (general-purpose computing on graphics processing units), a configuration using a GPU machine in the data assimilation step 50 is considered as an apparatus configuration being a modified configuration of Embodiment 2.

In a possible thermal-stress evaluation method as another modified configuration of Embodiment 2, thermal stress necessary for heat cycle fatigue evaluation is obtained from an expected value of displacement distribution (probability distribution) in the post-processing step 60.

High-speed startup or flexible operation of a steam turbine is demanded for the necessity of efficient operation of the steam turbine under environment of introduction of a large amount of regenerated energy. On the other hand, high-speed startup or flexible operation increases the amount of thermal deformation caused by an increase in temperature difference in the metal portion, which causes a reduction in clearance, leading to an increase in possibility of contact of a rotation restraint part. This leads to a demand for a technique for accurately evaluating the clearance during load variation, and a demand for a technique for evaluating the clearance in real time.

A specific effect of Embodiment 2 includes that even if an inaccurate model to predict the heat transfer rate is obtained in the analysis-condition creation step 20, since the heat transfer rate can be corrected by data assimilation calculation, heat transfer/thermal deformation analysis of the metal portion can be performed more accurately. This effect allows accurate clearance evaluation results to be obtained.

Embodiment 3

In Embodiment 3, a specific example of the contraction-model construction step 40 to construct the contraction model is described using numerical expressions with the method in Embodiment 2 to evaluate the clearance 320 during startup operation using the measurement results of temperature, expansion, differential expansion, and the like.

First, the following processing steps S2a to S2c are performed for a method for constructing the heat-transfer contraction model 42.

In the processing step S2a, a snapshot matrix of expression (1) is first constructed.

$$S1 = [X1_1, \ldots, X1_{nb\_cols\_S1}] \quad (1)$$

In the expression (1), (nb_cols_S1) is the number of node temperature vectors 32 extracted from the snapshot database DB3, $X1_i$ is a d dimensional node temperature vector in the snapshot database DB3, and S1 is a d×nb_cols_S1 snapshot matrix.

For example, the d×nb_cols_S1 snapshot matrix S1 (expression (1)), in which a plurality of (nb_cols_S1) d1 dimensional node temperature vectors 32 (represented by X1 in the expression) are extracted from the snapshot database DB3, and the node temperature vectors are arranged in columns, is constructed.

Subsequently, in the processing step S2a, the expression (1) is approximated by expression (2).

$$S1 = U1 \cdot \Sigma1 \cdot W1^T \quad (2)$$

In the expression (2), U1 is a d1×r1 matrix in which left singular value vectors are arranged in columns, W1 is a d1×r1 matrix in which right singular value vectors are arranged in columns, and Σ1 is a r1×r1 matrix having singular values as diagonal components.

For example, the r1th singular value in descending order is obtained by truncated singular value decomposition of the snapshot matrix S1, and the snapshot matrix S1 in the expression (1) is approximated as shown in the expression (2) by a matrix product of the matrix U1 in which the left singular value vectors are arranged in columns, the r1×r1 matrix Σ1 in which the singular values are arranged as diagonal components, and the matrix W1 in which the right singular value vectors are arranged in columns. As a result, each column of the matrix U1 becomes a base vector of a subspace characterizing the linear space defined by a set of the node temperature vectors 32 (X1).

In the processing step S2b, an r1 dimensional contraction temperature vector φ1 of expression (3) is defined by a product of a transposed matrix of the matrix U1 and the node temperature vector 32 (X1).

$$\varphi = U1^T \cdot X1 \quad (3)$$

In the processing step S2c, a d1 dimensional simultaneous linear ordinary differential equation, in which the unknown variable is the node temperature vector 32 (X1) obtained through finite element approximation of a spatial term of a transient heat transfer equation, is dimensionally lowered by Galerkin projection to derive a heat-transfer contraction model expression.

First, the d1 dimensional simultaneous linear ordinary differential equation with the node temperature vector 32 (X1) as the unknown variable can be represented as shown in expression (4).

$$M11 \frac{dX1}{dt} + \left( M12 + \sum_{f=1}^{nb\_surfaces\_HTC} h_f M13_f \right) X1 = \sum_{f=1}^{nb\_surfaces\_HTC} h_f TG_f B13_f \quad (4)$$

In the expression (4), (nb_surface_HTC) is the number of metal surface portions at each of which a heat transfer condition is set, X1 is a d1 dimensional node temperature vector 32, $h_f$ is a heat transfer coefficient of each surface, $TG_f$ is ambient temperature 24 of each surface, M11 is a d1×d1 matrix on discretization of a heat capacity term, M12 is a d1×d1 matrix on discretization of a heat transfer term, and M13$_f$ and B13$_f$ are a d1×d1 matrix and a d1 dimensional vector, respectively, on discretization of a heat transfer term for a surface f.

Furthermore, to derive a dimensionally lowered heat-transfer contraction model expression from the expression (4), the unknown variable X1 in the expression (4) is replaced with the contraction temperature vector φ1 by the relational expression of the expression (3), and the right side and the left side of the expression (4) are each multiplied by the transposed matrix of U1. This makes it possible to obtain a heat-transfer contraction model expression of expression (5) being a low dimensional (r1) simultaneous linear ordinary differential equation with the contraction temperature vector φ1 as an unknown variable.

$$M11R \frac{d\varphi1}{dt} + \left( M12R + \sum_{f=1}^{nb\_surfaces\_HTC} h_f M13R_f \right) \varphi1 = \sum_{f=1}^{nb\_surfaces\_HTC} h_f TG_f B13R_f \quad (5)$$

In the expression (5), M11R, M12R, M13R$_f$, and B13R$_f$ are calculated by the following expressions (6), (7), (8), and (9), respectively.

$$M11R = U1^T \cdot M11 \cdot U1 \quad (6)$$

$$M12R = U1^T \cdot M12 \cdot U1 \quad (7)$$

$$M13R_f = U1^T \cdot M13_f \cdot U1 \quad (8)$$

$$B13R_f = U1^T \cdot B13_f \quad (9)$$

These are the method of constructing the heat-transfer contraction model 42 in the contraction-model construction step of FIG. 4. Subsequently, description is made on the following processing steps S1a to S3c as a method of constructing the structure contraction model 43 in the contraction-model construction step of FIG. 4. The processing steps S2a to S2c and the processing steps S1a to S3c essentially perform the same processing while data to be treated is partially different (for example, the node temperature vector 32 in the former, and the node displacement vector 33 in the latter).

In the processing step S3a, a snapshot matrix of expression (10) is first constructed.

$$S2 = [X2_1, \ldots, X2_{nb\_cols\_S2}] \quad (10)$$

In the expression (10), (nb_cols_S2) is the number of node displacement vectors 33 extracted from the snapshot database DB3, X2$_i$ is a d2 dimensional node displacement vector in the snapshot database DB3, and S2 is a d2×nb_cols_S2 snapshot matrix.

For example, the d2×nb_cols_S2 snapshot matrix S2 (expression (10)), in which a plurality of (nb_cols_S2) d2 dimensional node displacement vectors 33 (represented by X2 in the expression) are extracted from the snapshot database DB3, and the node displacement vectors are arranged in columns, is constructed.

Subsequently, in the processing step S3a, the expression (10) is approximated by expression (11).

$$S2 = U2 \cdot \Sigma2 \cdot W2^T \quad (11)$$

In the expression (11), U2 is a d2×r2 matrix in which left singular value vectors are arranged in columns, W2 is a d2×r2 matrix in which right singular value vectors are arranged in columns, and Σ2 is a r2×r2 matrix having singular values as diagonal components.

For example, r2 number of singular values in descending order are obtained by truncated singular value decomposition of the snapshot matrix S2, and the snapshot matrix S2 in the expression (10) is approximated as shown in the expression (11) by a matrix product of the matrix U2 in which left singular value vectors are arranged in columns, the r2×r2 matrix Σ2 in which singular values are arranged as diagonal components, and the matrix W2 in which right singular value vectors are arranged in columns. As a result, each column of the matrix U2 becomes a base vector of a subspace characterizing the linear space defined by a set of the node displacement vectors 33 (X2).

In the processing step S1*b*, an r2 dimensional contraction displacement vector φ2 of expression (12) is defined by a product of a transposed matrix of the matrix U2 and the node displacement vector 33 (X2).

$$\varphi 2 = U2^T \cdot X2 \qquad (12)$$

In the processing step S3*c*, a d2 dimensional simultaneous linear equation, in which the unknown variable is the node displacement vector 33 (X2) obtained through finite element approximation of a structural equation containing a thermal stress term, is dimensionally lowered by Galerkin projection to derive a structure contraction model expression.

The d2 dimensional simultaneous linear equation with the node displacement vector 33 (X2) as the unknown variable can be represented as shown in expression (13).

$$M21X2 = \sum_{f=1}^{nb\_surfaces\_P} P_f B22_f + M23(X1 - T1_0) + B24 \qquad (13)$$

In the expression (13), (nb_surface_P) is the number of metal surface portions at each of which a pressure condition is set, X2 is a d2 dimensional node temperature vector 33, T1 is a d1 dimensional node temperature vector 32, no is a d1 dimensional node temperature vector providing reference temperature of thermal strain, $p_f$ is wall surface pressure 25 of each surface, M21 is a d2×d2 matrix on discretization of a stiffness term, M23 is a d2×d2 matrix on discretization of thermal stress, B22$_f$ is a d2 dimensional vector on discretization of pressure for a surface f, and B24 is a d2 dimensional vector on discretization of another external force such as gravity.

Furthermore, to derive a dimensionally lowered structure contraction model expression from the expression (12), the unknown variable X2 in the expression (13) is replaced with the contraction displacement vector φ2 by the relational expression of the expression (12), and the right side and the left side of the expression (13) are each multiplied by the transposed matrix of U2. This makes it possible to obtain a structure contraction model expression of expression (14) being a low dimensional (r2) simultaneous linear equation with the contraction displacement vector φ2 as an unknown variable. In the expression (14), the term of MR23 (φ1-φ1$_0$) represents a thermal stress term modeled as a function of the contraction temperature vector. These are the method of constructing the structure contraction model.

$$MR21\phi 2 = \sum_{f=1}^{nb\_surfaces\_P} P_f BR22_f + MR23(\phi 1 - \phi 1_0) + BR24 \qquad (14)$$

In the expression (14), M21R, M23R, B22Rf, B24, and φ1$_0$ are calculated by the following expressions (15), (16), (17), (18), and (19), respectively.

$$M21R = U2^T \cdot M21 \cdot U2 \qquad (15)$$

$$M23R = U2^T \cdot M23 \cdot U2 U2 \qquad (16)$$

$$B22R_f = U2^T \cdot B23 U2 \qquad (17)$$

$$\phi 1_0 = U1^T \cdot X1_0 \qquad (19)$$

In the construction of the heat-transfer contraction model 42 described in Embodiment 3, the finite element equation of the expression (4) is contracted from the high dimension (d1) to the low dimension (r1) expression (5) while a heat-transfer coefficient parameter is remained. It is therefore possible to investigate effect evaluation of the heat transfer coefficient using the heat-transfer contraction model. In particular, the expression (5) can be used as an alternative of the finite element equation of the expression (4) to identify the heat transfer coefficient in data assimilation calculation.

Similarly, in the construction of the structure contraction model 43, the finite element equation of the expression (13) is contracted from the high dimension (d2) to the low dimension (r2) expression (14) while a pressure parameter is remained. In particular, the thermal stress term is dimensionally lowered to the r2 dimension as a function of the contraction temperature vector. It is therefore possible to use the expression (14) as an alternative of the finite element equation of the expression (13) in data assimilation calculation.

Although lowering dimension of a finite element equation typically causes error for the finite element equation, when a large number of results similar to actually possible temperature distribution and displacement distribution are contained in the snapshot database DB3, contraction of d1>>r1 or d2>>r2 is possible while practical accuracy is maintained. In this case, since the expressions (4) and (13) being the finite element equations can be substituted by the expressions (5) and (14), respectively, being the contraction model expressions allowing high-speed calculation, the data assimilation calculation can be performed within a practical time period.

Using the contraction model of Embodiment 3 makes it possible to perform the data assimilation calculation within a practical time period.

In Embodiment 3, when material characteristics have temperature dependence, the matrix M11 involved in density and specific heat and the matrix M12 involved in thermal conductivity in the expression (4) are each a function of temperature. Similarly, the matrix M21 involved in Young's modulus and Poisson's ratio, the matrix M23 involved in a coefficient of thermal expansion, and the vector B24 involved in gravity (density) in the expression (13) are each a function of temperature. Even if the coefficient matrix is a function of temperature and the expressions (4) and (13) are each a nonlinear equation as described above, the heat-transfer contraction model expression and the structure contraction model expression can be easily constructed from the expressions (4) and (13), respectively, by a method called TPLM (Trajectory Piecewise Linear Method).

Furthermore, in Embodiment 3, when the metal portion has a high temperature, although influence of radiation needs to be considered, when a radiation phenomenon is modeled, a vector as the fourth power of each component of the node temperature vector appears in the expression (4). In such a case, the heat-transfer contraction model expression can be easily constructed from the expression (4) by a method called DEIM (Discrete Empirical Interpolation Method).

Embodiment 4

In Embodiment 4, a specific method of the data assimilation step 50 in FIG. 1 is described in detail. A specific example of the data assimilation step 50 is now described with Embodiment 2, i.e., with the method of evaluating the clearance 320 during startup operation using the measurement results of temperature, expansion, differential expansion, and the like. Embodiment 4 uses the expressions (5) and (14) in Embodiment 3 as contraction models.

The state space models used in the data assimilation step 50 are configured by the following expressions (20) to (26). Although such expressions representing the state space models are described in detail below, various data used in the expressions is in advance arranged and briefly described. That is, the data to be used herein can be classified into an unknown variable (probability distribution), a preset parameter, a newly introduced matrix, and other data.

FIG. 5 shows the data on the unknown variable (probability distribution) of these. Types of the data on the unknown variable (probability distribution) include a state variable, an observation variable, and an evaluation variable. The state variable to be used includes the contraction temperature vector $\varphi 1$, the contraction displacement vector $\varphi 2$, the heat transfer rate 23A ($h_f$), and dispersion $(\varepsilon f)^2$ in random walk of the heat transfer rate $h_f$. The observation variable to be used includes a vector $X1_{obj}$ in which temperatures at thermometer installation points are arranged, and a vector $X2_{obj}$ in which expansions/differential-expansions at installation points of expansion/differential-expansion indicators are arranged. The evaluation variable to be used includes a vector $X2_{pred}$ in which clearances at evaluation positions are arranged.

Figures 6, 7:
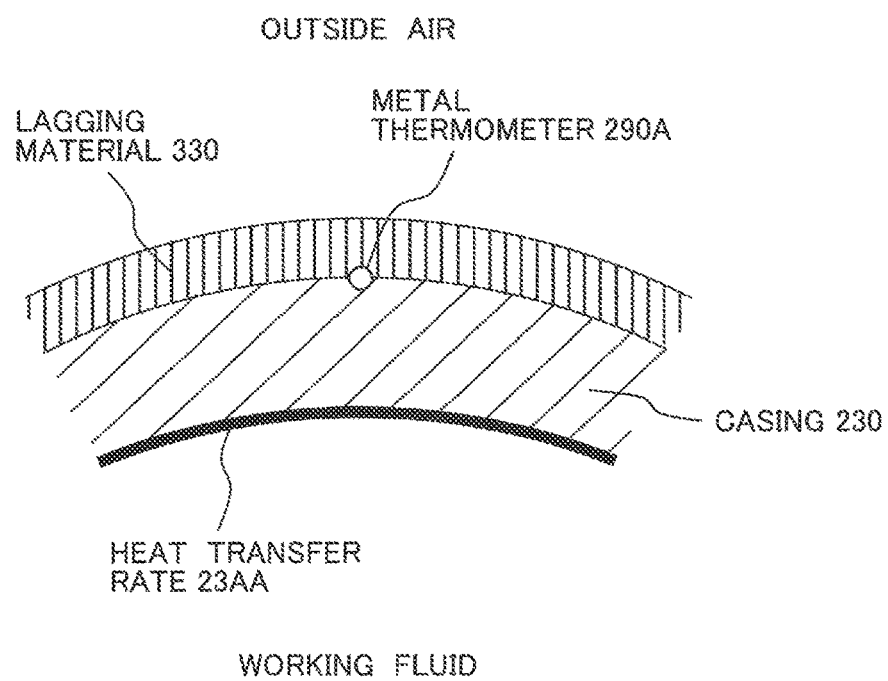
FIG. 6 is a view illustrating data on a preset parameter used in the state space model.
FIG. 7 is a view illustrating an exemplary structure of a casing covered with a lagging material 330.

FIG. 6 shows the data on the preset parameter of those. The heat transfer rate 23B ($h_f$) of each surface, the ambient temperature 24 ($TG_f$) of each surface, the wall surface pressure 25 ($P_f$) of each surface, and dispersion $\tau^2$ in random walk of the heat transfer rate $h_f$ are used.

As the newly introduced matrix, a matrix M31 representing a relation between the contraction temperature vector $\varphi 1$ and the vector $X1_{obj}$ in which temperatures at thermometer installation points are arranged, a matrix M32 representing a relation between the contraction displacement vector $\varphi 2$ and the vector $X2_{obj}$ in which expansions/differential-expansions at installation points of expansion/differential-expansion indicators are arranged, and a matrix M33 representing a relation between the contraction displacement vector $\varphi 2$ and the vector $X2_{pred}$ in which clearances at evaluation positions are arranged are defined.

Further, other data to be used includes the number Nb_23As of surfaces to each of which a parameter of the heat transfer rate 23A is allocated, average a, and normal distribution Normal (a, $b^2$) of dispersion $b^2$. Current time is indicated as $t_n$, and subsequent evaluation time is indicated as $t_{n+1}$.

Expression (20) is a time evolution equation of temperature distribution.

$$M11R\frac{d\phi 1}{dt} + \left(M12R + \sum_{f=1}^{nb\_23A} h_f M13R_f + \sum_{f=nb\_23A+1}^{nb\_surfaces\_HTC} h_f M13R_f\right)\phi 1 = \sum_{f=1}^{nb\_surfaces\_HTC} h_f TG_f B13R_f \quad (20)$$

Expression (21) is an expression of displacement distribution.

$$MR21\phi 2 = \sum_{f=1}^{nb\_surfaces\_P} P_f BR22_f + MR23(\phi 1 - \phi 1_0) + BR24 \quad (21)$$

Expressions (22) and (23) are each a random-walk-type time evolution expression of a heat-transfer-rate parameter.

$$h_f(t^{n+1}) \sim h_f(t^n) + \text{Normal}(0, \varepsilon_f^2(t^n)) \quad (22)$$

$$\log(\varepsilon_f^2(t^{n+1})) \sim \log(\varepsilon_f^2(t^n)) + \text{Normal}(0, \tau^{-2}) \quad (23)$$

Expression (24) is a relational expression of temperature at a measurement position and a contraction vector.

$$X1_{obj} = M31\phi 1 \quad (24)$$

Expression (25) is a relational expression of expansion as well as differential expansion at a measurement position and a contraction displacement vector.

$$X2_{obj} = M32\phi 2 \quad (25)$$

Expression (26) is a relational expression of a clearance at a measurement position and a contraction displacement vector.

$$X2_{pred} = M33\phi 2 \quad (26)$$

In a series of the expressions (20) to (26) representing the state space models used in the data assimilation step 50, the expression (5) of the heat-transfer contraction model is used for the expression (20), and the expression (14) being the structure contraction model expression is used for the expression (21). In the expression (20), however, the term on the heat transfer rate in the left side of the expression (5) is separated into an identification parameter 23A and a preset parameter 23B.

The unknown variables in the state space model expressions collectively shown in FIG. 5 include the state variable that cannot be directly observed from outside, the observation variable that can be observed and compared to measured values, and the evaluation variable to be intentionally finally evaluated, which are each treated as probability distribution.

The state variable includes the contraction temperature vector $\varphi 1$, the contraction displacement vector $\varphi 2$, the heat transfer rate 23A ($h_f$), and the dispersion $(\varepsilon f)^2$, which are classified as the identification parameters as described above. $\varphi 1$ is calculated using the expression (20), and $\varphi 2$ is calculated using the expression (21). The heat transfer rate 23A ($h_f$) is assumed to perform random walk with the dispersion $(\varepsilon f)^2$ and modeled by the expression (22) in order to be identified from a measured value. The dispersion $(\varepsilon f)^2$ itself is also assumed to perform random walk and modeled by the expression (23). In the expressions (22) and (23), f is 1 to nb_23A.

The observation variable shown in FIG. 5 includes the vector $X1_{obj}$ in which temperature values at observation positions are arranged, and the vector $X2_{obj}$ in which expansion values and differential-expansion values at measurement positions are arranged. The respective variables can be obtained by the expressions (24) and (25).

The evaluation variable shown in FIG. 5 includes the vector $X2_{pred}$ in which the clearances at evaluation positions are arranged. The $X2_{pred}$ is obtained by the expression (26). These are explanation of the unknown variables (state variable, observation variable, evaluation variable).

The state space model expression contains the beforehand provided preset parameter of FIG. 6 in addition to the unknown variables. The preset parameter includes the heat transfer rate 23B, the ambient temperature 24 (TG$_f$), and the wall surface pressure 25 (P$_f$). The preset parameter further includes the dispersion $\tau^2$ in random walk of dispersion (εf)$^2$.

In the data assimilation step 50 of FIG. 4, the unknown variable (probability distribution) shown in FIG. 5 is represented as a particle set for each of the state space model expressions of the expressions (20) to (26), and then the following processing steps S4a to S4d corresponding to the processing steps S1a to S1d, respectively, are repeated to obtain time evolution of each unknown variable.

In the processing step S4a, time evolution calculation is performed on each particle from current time $t_n$ to subsequent evaluation time in each of the expressions (20) to (26) of the state space models.

In the processing step S4b, a likelihood value of each particle is calculated. In this Embodiment, only the matching degree of temperature is considered, and likelihood ΓT defined by expression (27) is used.

$$\overset{Likelihood}{\Gamma T} = \prod_{i=1}^{nb\_obj\_T} \frac{1}{\sqrt{2\pi\sigma_T^2[i]}} \exp\left(-\frac{(X1_{obj}[i] - Y1_{obj}[i])^2}{2\sigma_T^2[i]}\right) \quad (27)$$

In the expression (27), nb_obj_T is the total number of thermometers, $X1_{obj}[i]$ is a calculated value of temperature at an ith measurement point, $Y1_{obj}[i]$ is a measured value of temperature at the ith measurement point, and σT$^2$ is an ith component of a definition vector used for definition of the likelihood ΓT.

In the processing step S4c, particles are updated by resampling. That is, the number of particles is assumed to be N, and N particles are selected and duplicated from among a particle set while repetition is permitted, and an original particle set is replaced with the duplicated particle set. At this time, a larger number of particles are selected with a higher likelihood.

In the processing step S4d, the current time $t_n$ is reset to the subsequent evaluation time $t_{n+1}$, and processing is returned to the processing step S4a so that the above-described processing is repeated.

As described above, flow in the turbine forms a spatially and temporally complicated pattern and a condensation phenomenon of vapor may occur during startup. This often leads to a case where a heat transfer rate of a partial metal surface cannot be accurately calculated in the analysis condition setting step.

In Embodiment 4, the metal-surface heat transfer rate is sorted in a parameter 32A to be identified, and data assimilation calculation is performed, which makes it possible to obtain a more accurate value than the heat transfer rate obtained in the analysis-condition creation step 20. This improves temperature evaluation accuracy of the metal portion. As a result, thermal deformation evaluation accuracy and clearance evaluation accuracy are improved.

For example, in an exemplary structure of FIG. 7 showing a casing covered with a lagging material 330, consideration is made on a case where a heat-transfer-rate condition 23AA of an inner wall surface of a casing 230, in which a metal thermometer 290A is placed on an outer surface of the casing, is identified by the data assimilation calculation through the processing steps S4a to S4d in Embodiment 4.

Figure 8:
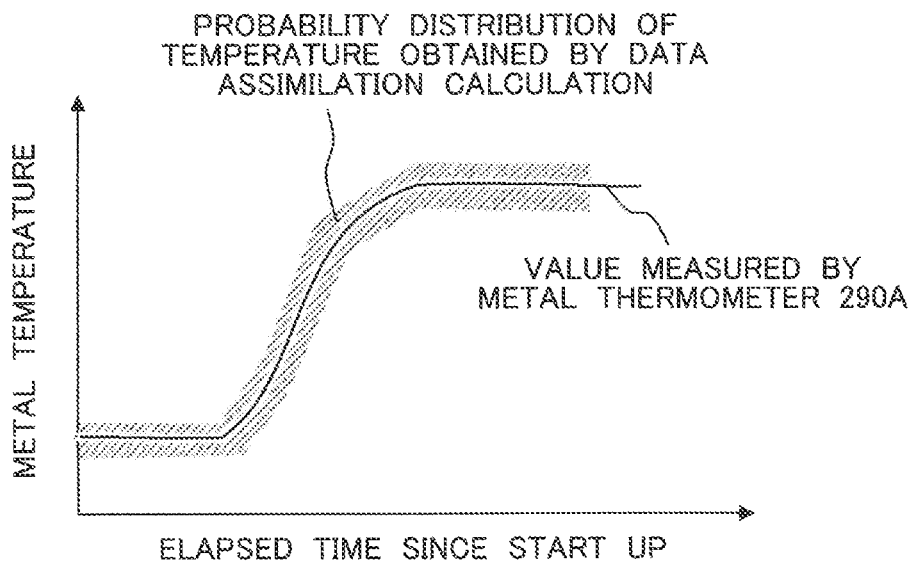
FIG. 8 is a view illustrating an exemplary temporal variation in value measured by a metal thermometer 290A and calculated temperature (probability distribution)
Figure 9:
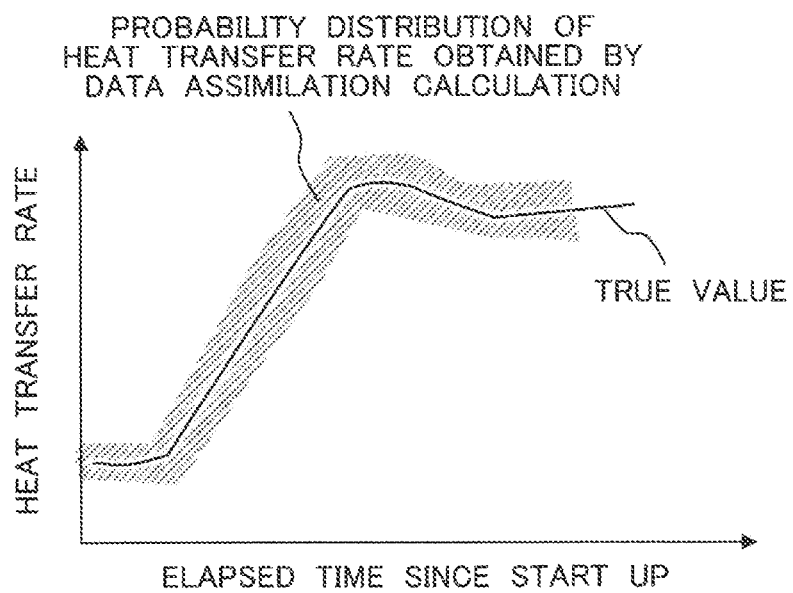
FIG. 9 is a view illustrating exemplary identification results.

In such a case, as shown in FIG. 8, a heat transfer rate (probability distribution) reflecting measurement results is automatically determined such that a temporal variation in measured value of the metal thermometer 290A corresponds to that of calculated temperature (probability distribution). FIG. 9 shows an exemplary identification result. Consequently, casing temperature distribution also reflects the measurement results; hence, thermal deformation evaluation is performed using the results, making it possible to improve the clearance evaluation accuracy.

Effects of Embodiment 4 include improvement in temperature distribution/displacement distribution of metal and improvement in clearance evaluation accuracy due to improvement in accuracy of evaluation of the metal-surface heat-transfer-rate.

Although the likelihood ΓT, which shows the matching degree between the measured value and the calculated value of the metal temperature, is used in Embodiment 4, it is further considered that a likelihood ΓD is defined so as to represent the matching degree between measurement and calculation of expansion/differential-expansion as shown in expression (28), and a composite likelihood ΓT×ΓD defined by a product of ΓT and ΓD is used for the data assimilation calculation. In this case, probability distribution of the state variable can be obtained so as to correspond to each of the calculated values of temperature, expansion, and differential expansion.

$$\overset{Likelihood}{\Gamma D} = \prod_{i=1}^{nb\_obj\_D} \frac{1}{\sqrt{2\pi\sigma_D^2[i]}} \exp\left(-\frac{(X2_{obj}[i] - Y2_{obj}[i])^2}{2\sigma_D^2[i]}\right) \quad (28)$$

In the expression (28), nb_obj_D is the total number of expansion indicators and differential-expansion indicators, X2[i] is calculated values of expansion/differential-expansion at an ith measurement point, $Y2_{obj}[i]$ is measured values of expansion/differential-expansion at the ith measurement point, and σT$^2$ is an ith component of a definition vector used for definition of the likelihood ΓT.

It is clear that the ambient temperature 24 (TG$_f$) (expression (20)) and the wall surface pressure (P$_f$) (expression (21)) in the state space model expressions of the expressions (20) to (26) can each be treated as a parameter to be identified and identified from a measured value through the data assimilation calculation by a configuration similar to that of this Embodiment.

Although noise following normal distribution is given in the expressions (22) and (23), any noise following any of various distributions, such as Cauchy distribution, may be given.

Embodiment 5

Embodiment 5 shows an exemplary, modified configuration of Embodiment 2.

In the method and the apparatus for estimating the internal state of the thermal component of Embodiment 2 shown in FIG. 4, the data assimilation step 50 receives the measurement results 12 of the power plant, the analysis conditions 22 obtained in the analysis-condition creation step 20, and the contraction models (heat-transfer contraction model 42, structure contraction model 43) obtained in the contraction-model construction step 40, and obtains time evolutions of the state variables (probability distributions) containing the identification parameter 82 using the state space models including the contraction models 42 and 43.

Figure 10:
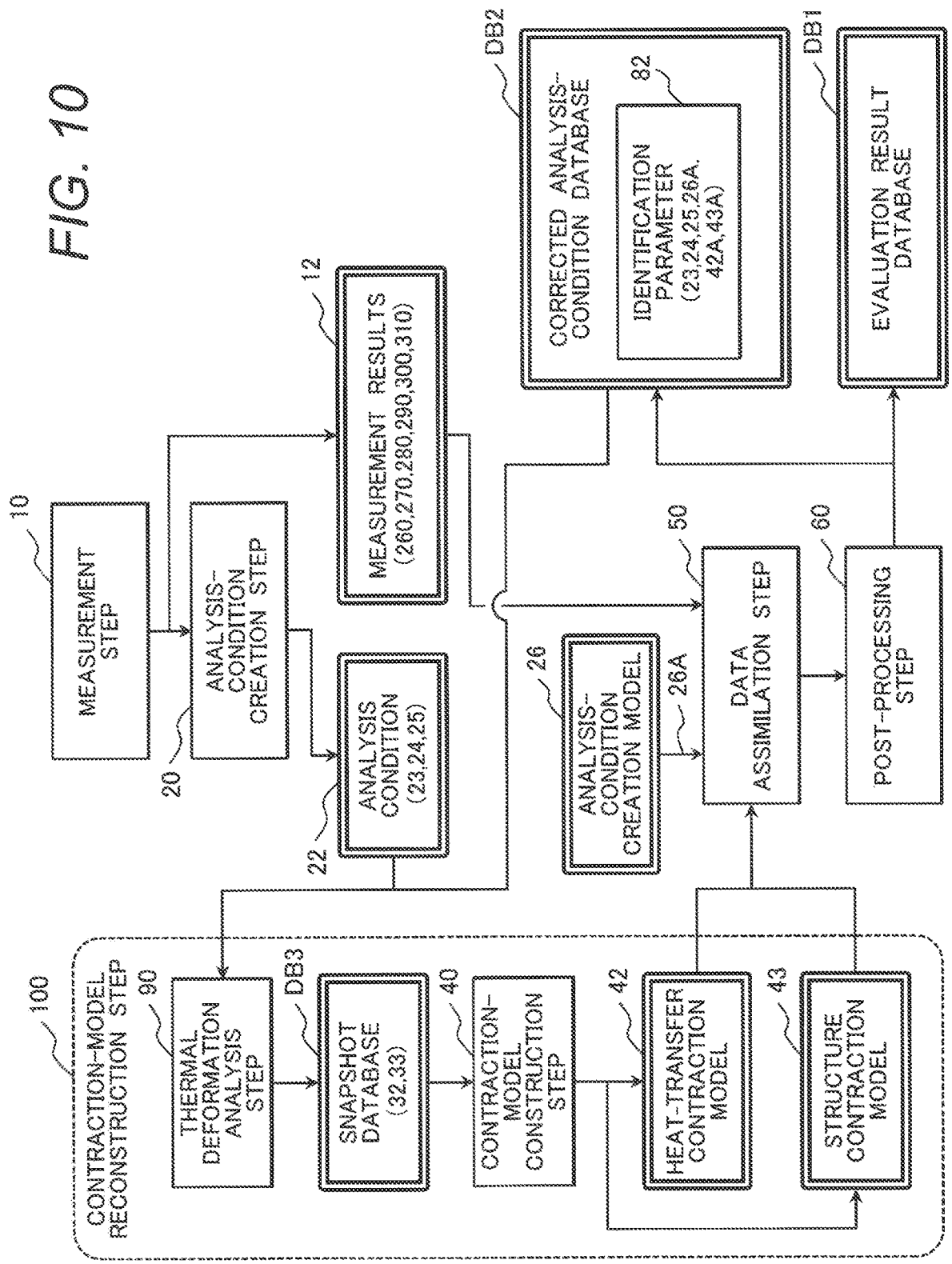
FIG. 10 is a view illustrating a method and an apparatus for estimating an internal state of a thermal component according to Embodiment 5.

On the other hand, the data assimilation step 50 of Embodiment 5 shown in FIG. 10 receives a model parameter 26A obtained in an analysis-condition creation model 26 instead of the analysis conditions 22 obtained in the analysis-condition creation step 20, and obtains time evolutions of the state variables (probability distributions) containing the identification parameter 82 using the state space models including the contraction models 42 and 43 and the analysis-condition creation model 26.

The analysis-condition creation model 26 corresponds to model representation of the function of the analysis-condition creation step 20. The analysis-condition creation model 26 is a calculation model that receives measured values and outputs the analysis conditions 22 as in the analysis-condition creation step 20, and includes, for example, a fluid/heat transfer circuit network analysis model. In the analysis-condition creation model 26, however, a fluid resistance coefficient, a correction factor for an expression of experimental arrangement of a heat transfer rate, or the like is derived as the model parameter 26A, as the analysis condition 22 in such a case. In the analysis-condition creation step 20, since operation using a fluid/heat transfer circuit network is internally performed, the analysis-condition creation model 26 is positioned as part of the analysis-condition creation step 20.

Embodiment 5 therefore can be recognized to evaluate the clearance 320 while identifying the model parameter 26A of the analysis-condition creation model 26 used in the analysis-condition creation step 20 by the data assimilation calculation in the data assimilation step 50.

FIG. 10 shows the method and the apparatus for estimating the internal state of the thermal component according to Embodiment 5.

The measurement step 10 of FIG. 10 receives time-series data of working fluid temperature, working fluid pressure, outside-air temperature, metal temperature, expansion, and differential expansion from the measuring instruments 260, 270, 280, 290, 300, and 310, and outputs the measurement results 12 and transmits the measurement results 12 to the analysis-condition creation step 20.

The analysis-condition creation step 20 uses the analysis-condition creation model 26 to create the analysis conditions 22 such as a metal-surface heat-transfer-rate 23, ambient (working fluid, outside air) temperature 24 in the vicinity of the metal, and wall surface pressure 25 required for performing thermal deformation analysis of a metal portion such as a turbine, a turbine rotor, or a casing based on the measured values obtained in the measurement step 10.

For example, when the fluid/heat transfer circuit network analysis is used as the analysis-condition creation model 26, such analysis conditions can be calculated by simulating mass transport or heat transport of the working fluid, heat transfer of the metal portion, heat transfer between the working fluid and the metal portion, and the like.

The snapshot database DB3 includes a set of a node temperature vector 32 as a result of obtaining time evolution of temperature distribution of the metal portion during startup by a finite element method, and a node displacement vector 33 as a result of obtaining thermal deformation of metal due to the temperature distribution of the node temperature vector 32 by a finite element method.

The analysis condition 22 (metal-surface heat-transfer-rate 23, ambient (working fluid, outside air) temperature 24 in the vicinity of the metal, or the wall surface pressure 25) as an analysis result of the analysis-condition creation step 20, or the identification parameter 82 as the corrected analysis condition is used as an analysis condition for the finite element method. The identification parameter includes the metal-surface heat-transfer-rate 23, the ambient (working fluid, outside air) temperature 24 in the vicinity of the metal, the wall surface pressure 25, the model parameter 26A of the analysis-condition creation model 26, the model variable 42A determining temperature distribution in the heat-transfer contraction model 42, and the model variable 43A determining displacement distribution in the structure contraction model 43.

The contraction-model construction step 40 is a step of extracting a subspace characterizing a linear space defined by the node temperature vector 32 in the snapshot database DB3, and producing the heat-transfer contraction model 42 from a finite element equation, which is given by discretizing a dominant equation of a heat transfer phenomenon of the metal portion, by Galerkin projection onto the subspace. Furthermore, the step extracts a subspace characterizing a linear space defined by the displacement distribution vector 33 in the snapshot database DB3, and produces the structure contraction model 43 from a finite element equation, which is given by discretizing a dominant equation of thermal deformation, by Galerkin projection onto the subspace.

In this Embodiment, as in Embodiment 2, a model variable determining temperature distribution in the heat-transfer contraction model 42 is defined as model variable 42A, and a model variable determining displacement distribution in the structure contraction model 43 is defined as model variable 43A.

The data assimilation step 50 uses the state space models including the contraction models 42 and 43 and the analysis-condition creation model 26 to obtain time evolutions of state variables (probability distributions) including the model parameters 42A, 43A, 26A, and the like by a particle filter method.

The model parameter 26A of the analysis-condition creation model 26 is treated as a state variable having a random-walk-type time evaluation process to allow identification from a measured value. Since the metal-surface heat-transfer-rate 23 ($h_f$), the ambient temperature 24 ($TG_f$), and the wall surface pressure 25 ($P_f$) in the model expression (expression 20) of the heat-transfer contraction model 42 and the model expression (expression 21) of the structure contraction model 43 are obtained from results of the analysis-condition creation model 26, the metal-surface heat-transfer-rate 23 ($h_f$), the ambient temperature 24 ($TG_f$), and the wall surface pressure 25 ($P_f$) are each also treated as probability distribution in the state space model. Hence, the identification parameters in this Embodiment are 23, 24, 25, 26A, 42A, and 43A.

In the particle filter method, probability distribution of the state variable is defined by a set of particles each having a specific state variable value, and then time evolution of the probability distribution is obtained through repetition of the following processing steps S5a to S5d.

In the processing step S5a, input values from the measurement instruments (260, 270, 280, 290, 300, 310) are given to corresponding variables of the space state models, and then time evolution calculation from current time to subsequent evaluation time is performed on each particle using the state space models.

In the processing step S5b, a likelihood value representing the matching degree between a measured value at the subsequent evaluation time and a measured value is calculated for each particle.

In the processing step S5c, particles are updated by resampling. That is, the number of particles is assumed to be N, and N particles are selected and duplicated from among a particle set while repetition is permitted, and an original particle set is replaced with the duplicated particle set. At this time, a larger number of particles are selected with a higher likelihood. This allows a particle closer to a measured value to survive, leading to a result reflecting a measurement result.

The processing step S5d returns to the processing step S5a.

Time evolutions of the probability distributions of the state variables including the identification parameters (metal-surface heat-transfer-rate 23, ambient (working fluid, outside air) temperature 24 in the vicinity of the metal, wall surface pressure 25, model parameter 26A of the analysis-condition creation model 26, model variable 42A determining temperature distribution in the heat-transfer contraction model 42, and the model variable 43A determining displacement distribution in the structure contraction model 43) are obtained through repetition of the processing steps S5a to S5d.

The post-processing step 60 is a step of substituting an expected value of the probability distribution of the model variable 43A for a beforehand derived relational expression of the model variable 43A and a clearance of each portion to obtain a temporal variation in the clearance during startup, and outputting the obtained results into the evaluation result database DB1. Furthermore, the step outputs a corrected analysis condition including an expected value of each state variable into the corrected analysis-condition database DB2.

The thermal deformation analysis step 90 obtains temperature distribution and deformation distribution of metal by finite element analysis, and outputs the distributions into the snapshot database DB3.

The contraction-model reconstruction step 100 reconstructs the contraction model using the data (metal-surface heat-transfer-rate 23, ambient (working fluid, outside air) temperature 24 in the vicinity of the metal, and wall surface pressure 25) stored in the corrected analysis-condition database DB2 by the thermal deformation analysis step 90 and the contraction-model construction step 40.

Embodiment 5 is configured such that the analysis-condition creation model 26 is contained in the state space model so that an analysis-condition creation model parameter 26A can be identified. In Embodiment 2, the metal-surface heat-transfer-rate 23A is directly identified, but when the number of surfaces to be identified (the number of parameters of the metal-surface heat-transfer-rate 23) is larger than the number of measurement instruments, the parameter is difficult to be identified.

In such a case, Embodiment 5 is preferably used. This is because the number of analysis-condition creation model parameters 26A is typically extremely smaller than the number of parameters 23A of the metal-surface heat-transfer-rate 23, allowing the data assimilation calculation even at a small number of measurement points.

Embodiment 5 allows the data assimilation calculation even at a small number of measurement instruments to be used.

Although Embodiment 5 is exemplified on turbine startup, the present invention can also be applied to load variation operation such as stop operation.

A combination of Embodiment 2 and Embodiment 5, i.e., a configuration, in which while the analysis-condition creation model parameter 26A is identified in Embodiment 5, the metal-surface heat-transfer-rate 23A of some wall surface is directly identified in Embodiment 2, can be easily achieved.

LIST OF THE REFERENCE CHARACTERS

10: Measurement step of structure state quantity and atmosphere state quantity
20: Analysis-condition creation step
DB3: Database containing solution vector of thermal deformation analysis (snapshot database)
40: Contraction-model construction step
50: Data assimilation step
60: Post-processing step
DB1: Evaluation result database
DB2: Corrected analysis-condition database
90: Thermal deformation analysis step
100: Contraction-model reconstruction step
12: Measurement result
22: Analysis condition
23: Metal-surface heat-transfer-rate
23A: Metal-surface heat-transfer-rate to be identified
23B: Metal-surface heat-transfer-rate using value of analysis conditions 22
24: Ambient (working fluid, outside air) temperature in the vicinity of metal
25: Wall surface pressure
32: Node temperature vector
33: Node displacement vector
42: Heat-transfer contraction model
43: Structure contraction model
82: Identification parameter
83: Preset parameter
110: Tuning step
200: Generator
210: Turbine
220: Turbine rotor
230: Turbine casing
240: Piping
250: Control valve
260: Working fluid thermometer
270: Outside-air thermometer
280: Working fluid thermometer pressure gauge
290: Metal thermometer
300: Expansion indicator
310: Differential-expansion indicator
320: Clearance

What is claimed is:

1. A method of estimating an internal state of a thermal component including at least one of a turbine and a boiler, the method comprising:
a measurement step of measuring a state quantity of the thermal component, the state quantity including at least one of a temperature of a working fluid, a pressure of the working fluid, an outside-air temperature of the turbine, a metal temperature of a turbine rotor, a metal temperature of a casing, an expansion of the casing, and a clearance between the turbine rotor and the casing;
an analysis-condition creation step of creating an analysis condition which is to be used to analyze an internal state of the thermal component;
a contraction-model construction step of obtaining a subspace characterizing a linear space defined by a vector set of each of the temperature distribution and the displacement distribution of a finite element model and constructing a contraction model from the finite element model using the subspace;
a data assimilation step of obtaining a probability distribution of the temperature distribution within the thermal component and the displacement distribution within the thermal component through data assimilation calculation using the contraction model, a measured value of the state quantity in the measurement step, and the analysis condition, wherein the contraction model is calculated by dimensionally lowering the finite element model;

a post-processing step of obtaining the internal state of the thermal component from an expected value of the probability distribution obtained in the data assimilation step;

an analysis step of obtaining solution vectors of each of the temperature distribution and the displacement distribution of the finite element model, wherein, in the data assimilation step, the probability distribution is calculated using the contraction model, wherein, in the analysis step and the contraction-model construction step, the contraction model is constructed using a result of the analysis-condition creation step, and wherein, in the data assimilation step, a metal-surface heat-transfer-rate condition on a metal surface of a metal in the thermal component and a model variable of the contraction model are identified as identification parameters for which the probability distribution is calculated.

2. The method according to claim 1, wherein, in the data assimilation step, a probability distribution of a corrected value of the analysis condition is obtained, wherein, in the post-processing step, the corrected value of the analysis condition is obtained, and wherein, in the analysis step and the contraction-model construction step, the contraction model is reconstructed using the corrected value from the post-processing step.

3. The method according to claim 1, wherein, in the contraction-model construction step, a heat-transfer contraction model showing heat transfer on the metal in the thermal component and a structure contraction model showing a clearance in the thermal component are used as the contraction model given by dimensionally lowering the finite element model for the internal state analysis of the thermal component.

4. The method according to claim 3, wherein the finite element model is dimensionally lowered with a heat-transfer coefficient parameter remaining when the heat-transfer contraction model regarding heat transfer on the metal in the thermal component is constructed as the contraction model.

5. The method according to claim 3, wherein the finite element model is dimensionally lowered with a pressure parameter remaining when the structure contraction model regarding the clearance in the thermal component is constructed as the contraction model given by dimensionally lowering the finite element model.

6. The method according to claim 1, wherein a model parameter is obtained from an analysis-condition creation model used in the analysis-condition creation step, and wherein, in the data assimilation step, the probability distribution of each of the temperature distribution and the displacement distribution in the thermal component is obtained through data assimilation calculation using the contraction model, the measured value of the measurement step, and the model parameter, wherein the contraction model is given by dimensionally lowering the finite element model for the internal state analysis of the thermal component.

7. An apparatus of estimating an internal state of a thermal component including at least one of a turbine and a boiler, wherein the apparatus is configured to perform:

a measurement step of measuring a state quantity of the thermal component, the state quantity including at least one of a temperature of a working fluid, a pressure of the working fluid, an outside-air temperature of the turbine, a metal temperature of a turbine rotor, a metal temperature of a casing, an expansion of the casing, and a clearance between the turbine rotor and the casing;

an analysis-condition creation step of creating an analysis condition which is to be used to analyze an internal state of the thermal component;

a contraction-model construction step of obtaining a subspace characterizing a linear space defined by a vector set of each of the temperature distribution and the displacement distribution of a finite element model and constructing a contraction model from the finite element model using the subspace;

a data assimilation step of obtaining a probability distribution of the temperature distribution within the thermal component and the displacement distribution within the thermal component through data assimilation calculation using the contraction model, a measured value of the state quantity in the measurement step, and the analysis condition, wherein the contraction model is calculated by dimensionally lowering a finite element model;

a post-processing step of obtaining the internal state of the thermal component from an expected value of the probability distribution obtained in the data assimilation step; and an analysis step of obtaining solution vectors of each of the temperature distribution and the displacement distribution of the finite element model, wherein, in the data assimilation step, the apparatus calculates the probability distribution using the contraction model in the contraction-model construction step and a metal-surface heat-transfer-rate condition on a metal surface in the thermal component and a model variable of the contraction model are identified as identification parameters, wherein, in the analysis step and the contraction-model construction step, the apparatus constructs the contraction model using a result of the analysis-condition creation step, wherein the measurement step, the analysis-condition creation step, the data assimilation step, and the post-processing step are performed on a thermal component side, wherein the analysis step and the contraction-model construction step are performed at a data management center which can manage data in a plurality of power plants, wherein communication is performed between the thermal component and the data management center, and wherein, in the data assimilation step, a metal-surface heat-transfer-rate condition on a metal surface in the thermal component and a model variable of the contraction model are identified as identification parameters for which the probability distribution is calculated.

* * * * *